Oct. 19, 1937.    J. E. SHARP ET AL    2,096,346
BOTTLE CAP MAKING AND APPLYING MACHINE
Filed Jan. 11, 1932    13 Sheets-Sheet 1
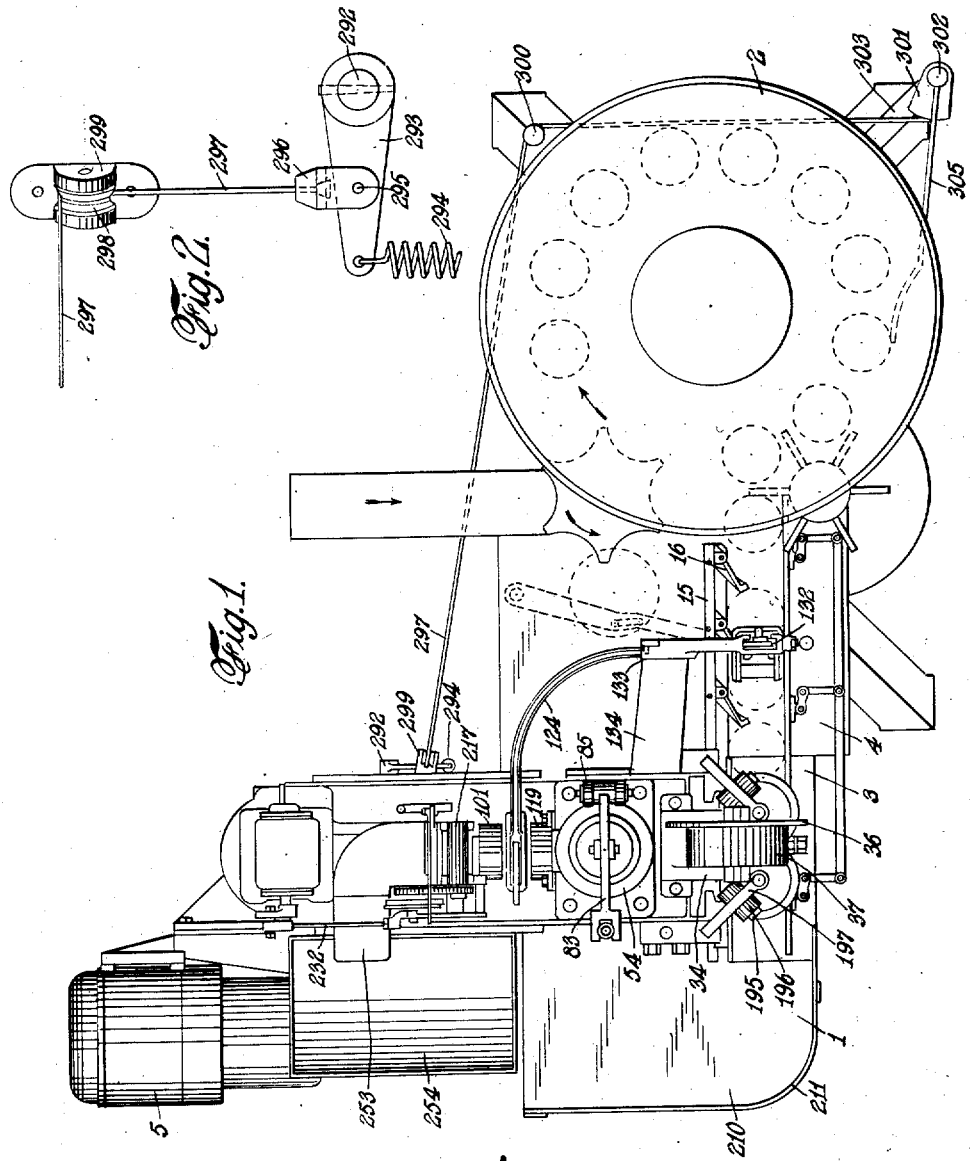
John E. Sharp and
Max M. Kipper INVENTORS
Wm. S. Pritchard
ATTORNEY

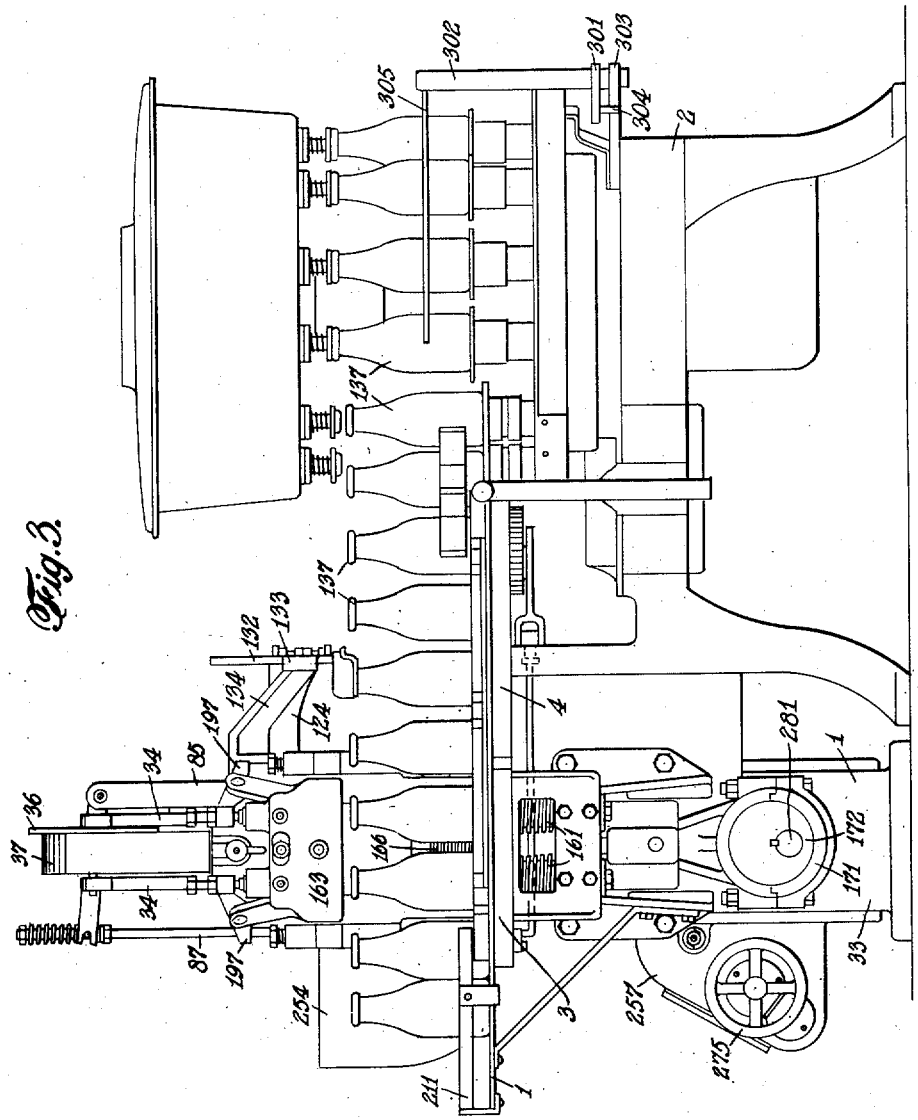

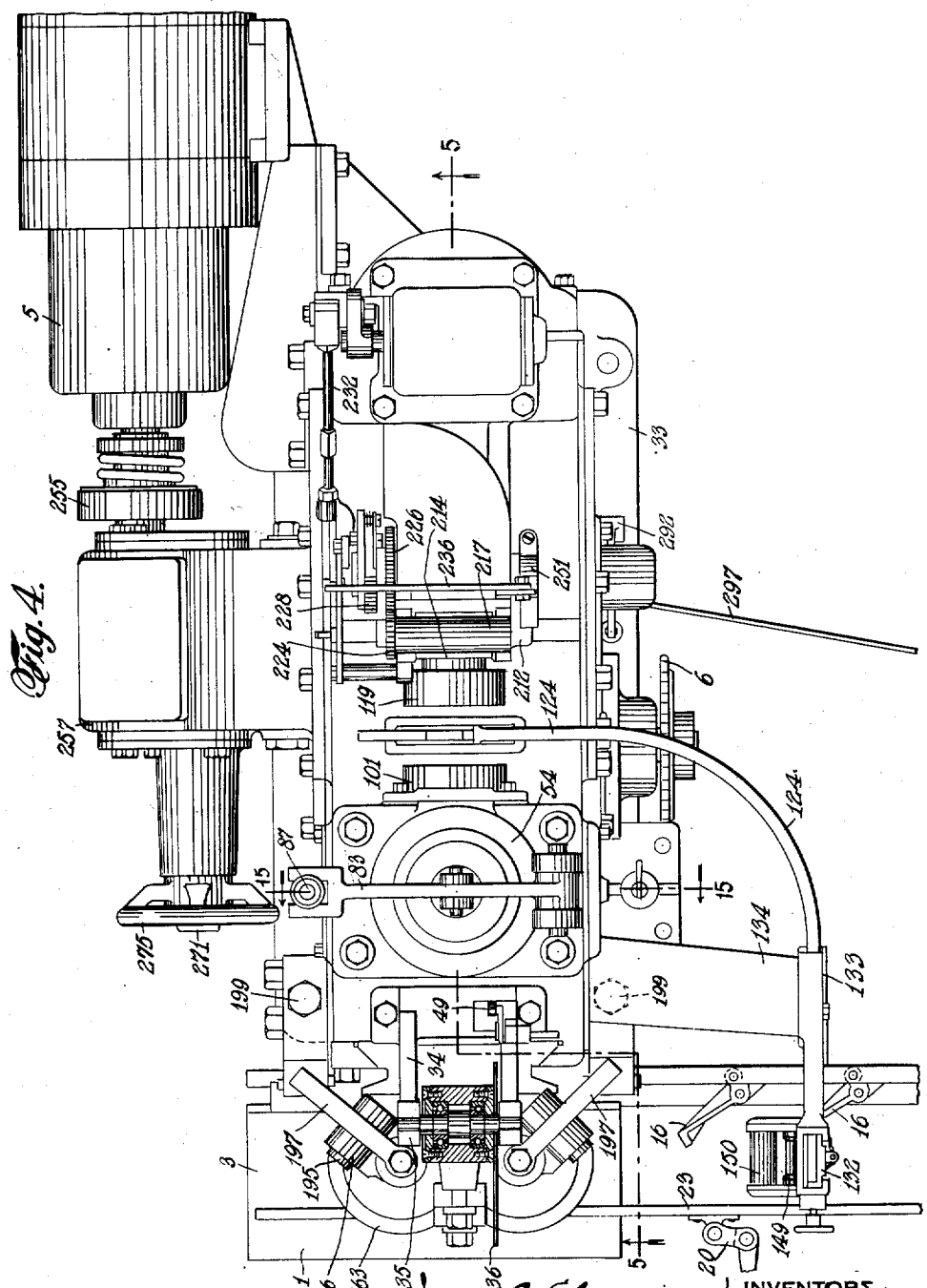

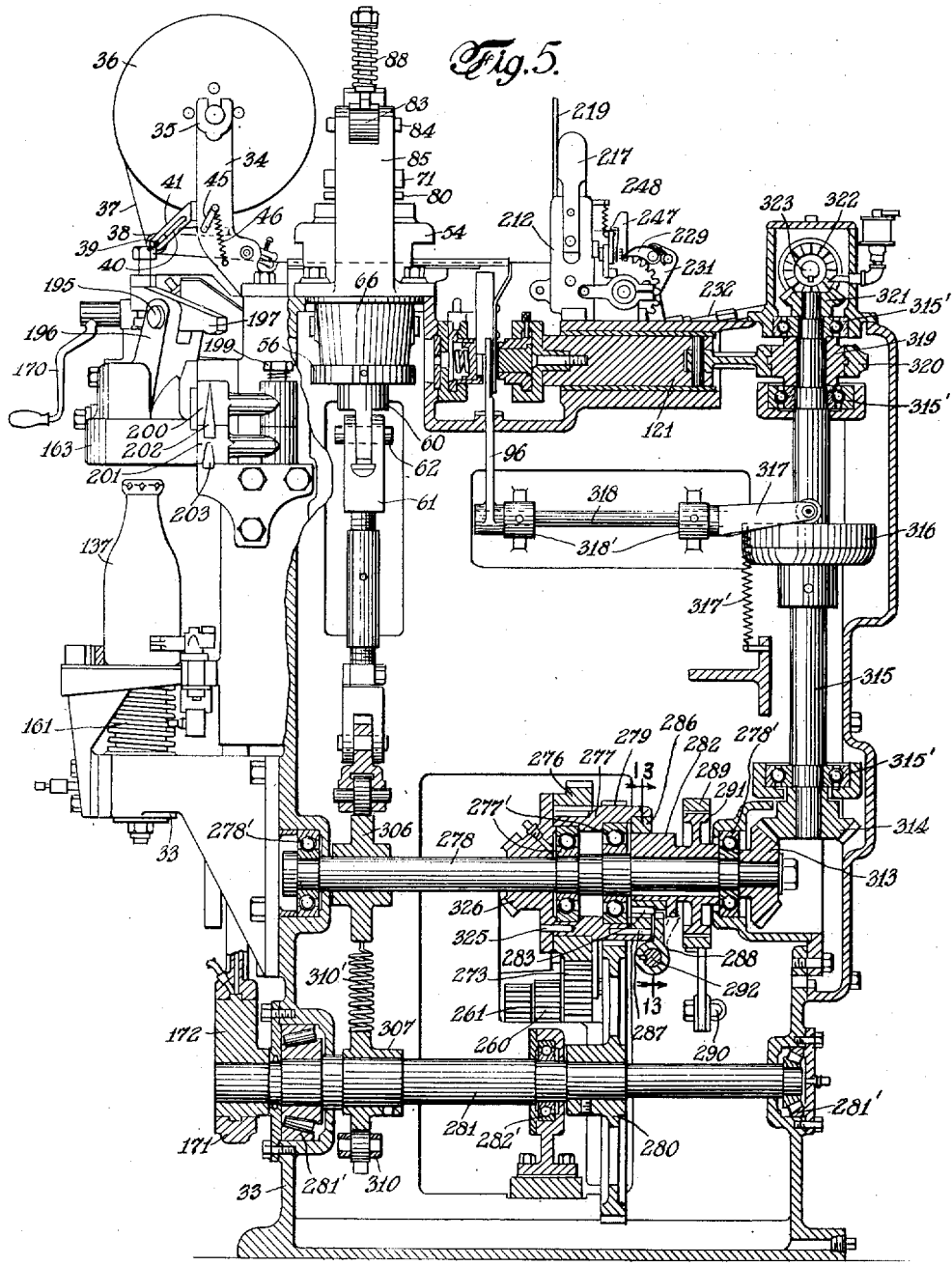

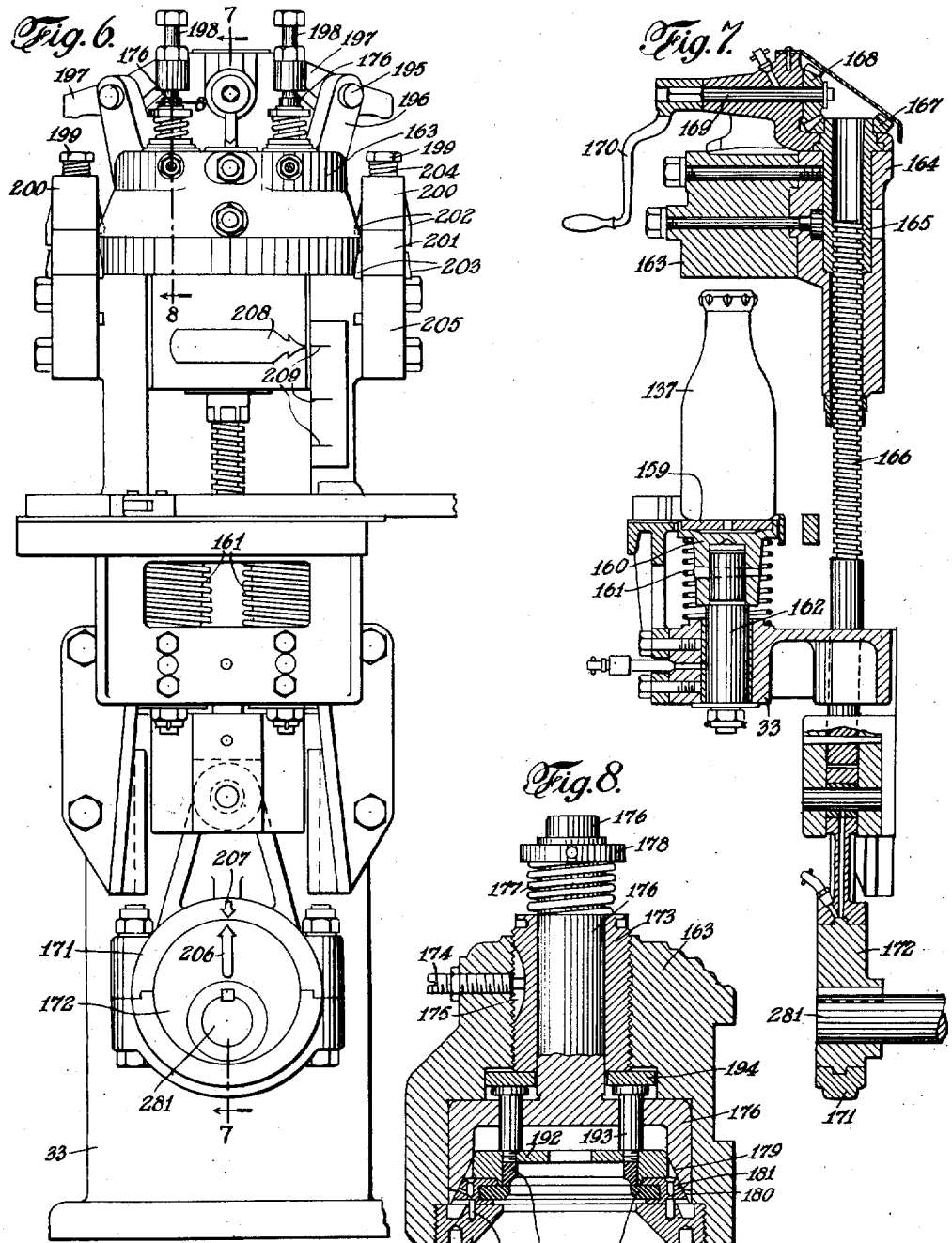

Oct. 19, 1937. J. E. SHARP ET AL 2,096,346
BOTTLE CAP MAKING AND APPLYING MACHINE
Filed Jan. 11, 1932 13 Sheets-Sheet 6
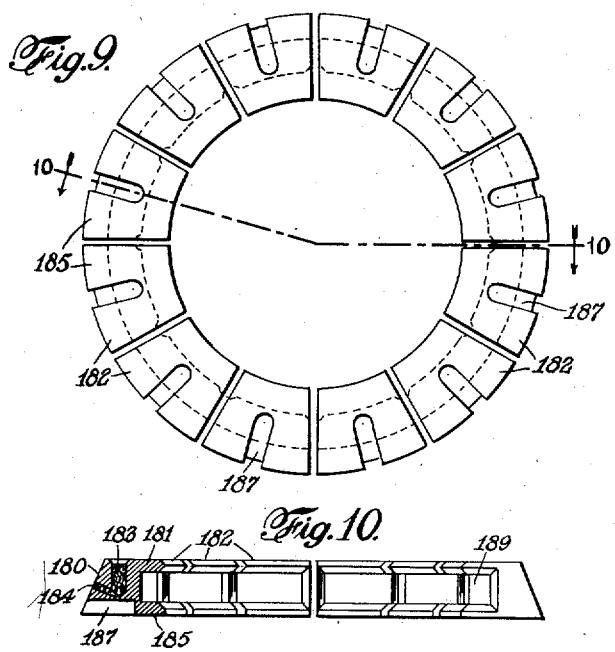
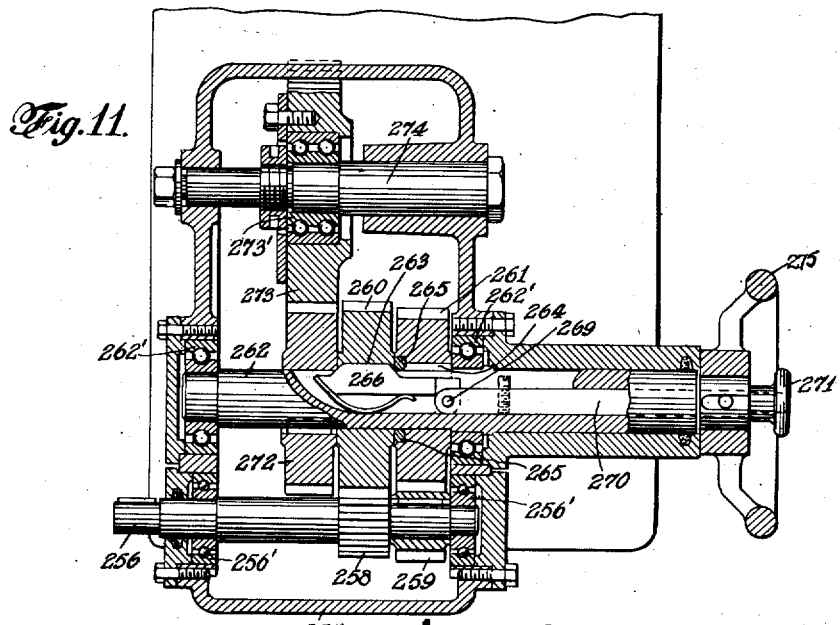

Oct. 19, 1937.   J. E. SHARP ET AL   2,096,346
BOTTLE CAP MAKING AND APPLYING MACHINE
Filed Jan. 11, 1932   13 Sheets-Sheet 7
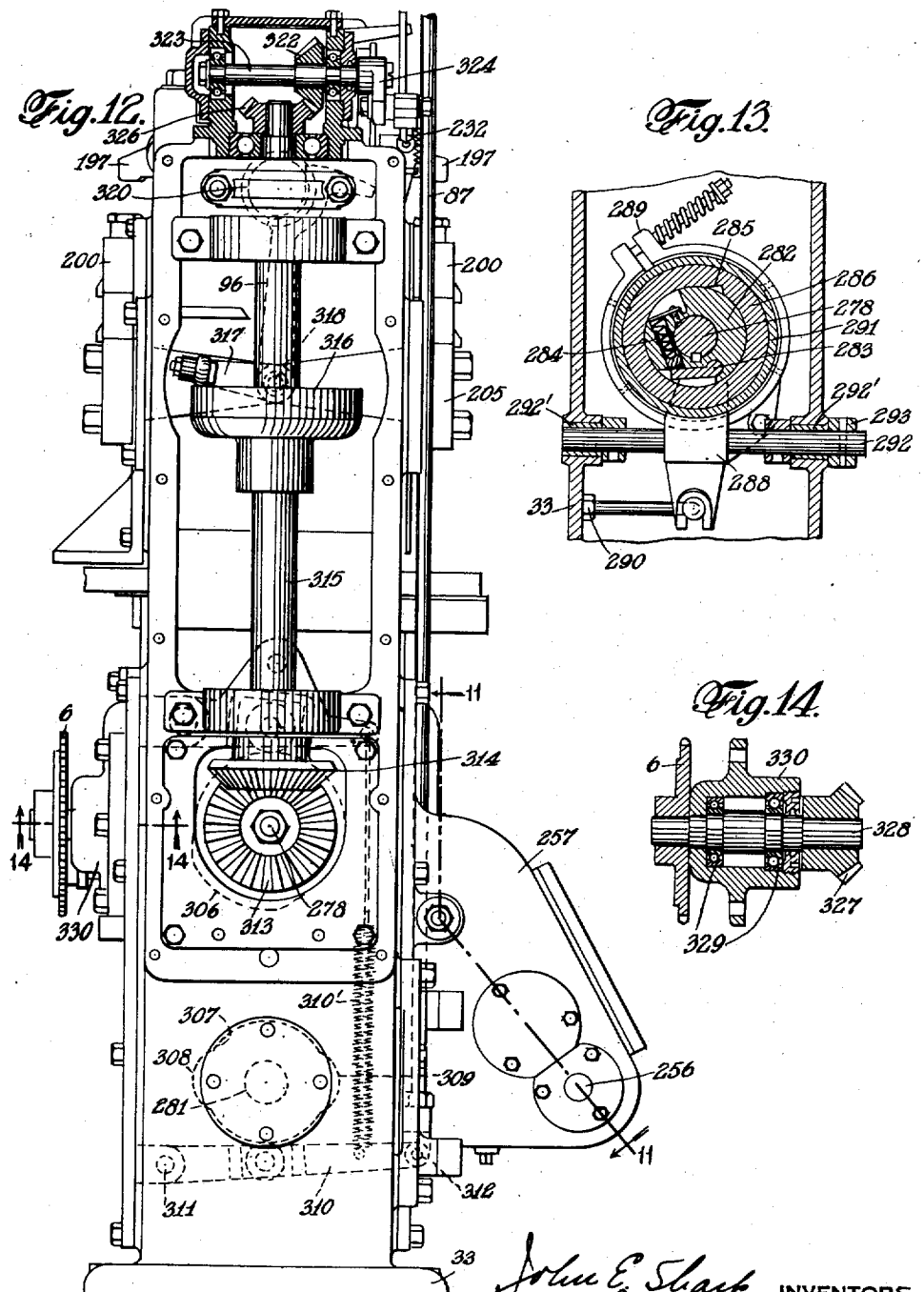
INVENTORS
John E. Sharp
and Max M. Kipper
BY Wm. S. Pritchard
ATTORNEY Oct. 19, 1937.  J. E. SHARP ET AL  2,096,346
BOTTLE CAP MAKING AND APPLYING MACHINE
Filed Jan. 11, 1932  13 Sheets-Sheet 8
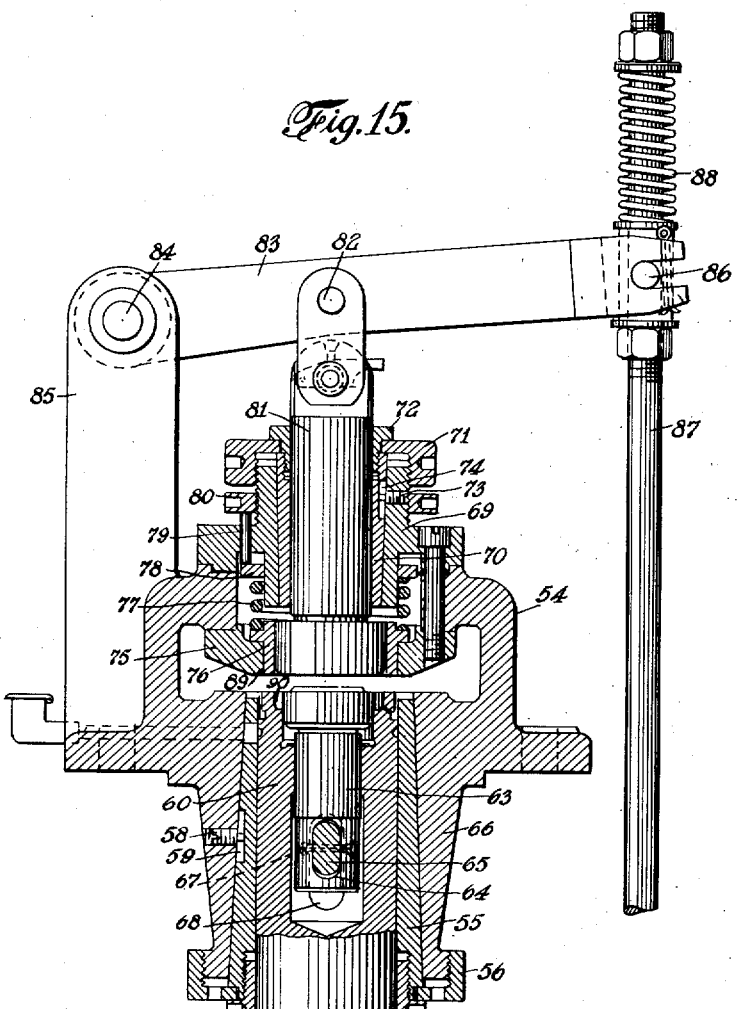
Fig. 15.
Fig. 33.
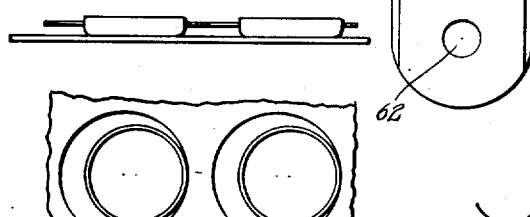
Fig. 32.
INVENTORS
ATTORNEY Oct. 19, 1937.　　J. E. SHARP ET AL　　2,096,346
BOTTLE CAP MAKING AND APPLYING MACHINE
Filed Jan. 11, 1932　　13 Sheets-Sheet 9

John E. Sharp and
Max M. Kipper
INVENTORS

BY Wm. S. Pritchard
ATTORNEY

Oct. 19, 1937.  J. E. SHARP ET AL  2,096,346
BOTTLE CAP MAKING AND APPLYING MACHINE
Filed Jan. 11, 1932  13 Sheets-Sheet 10
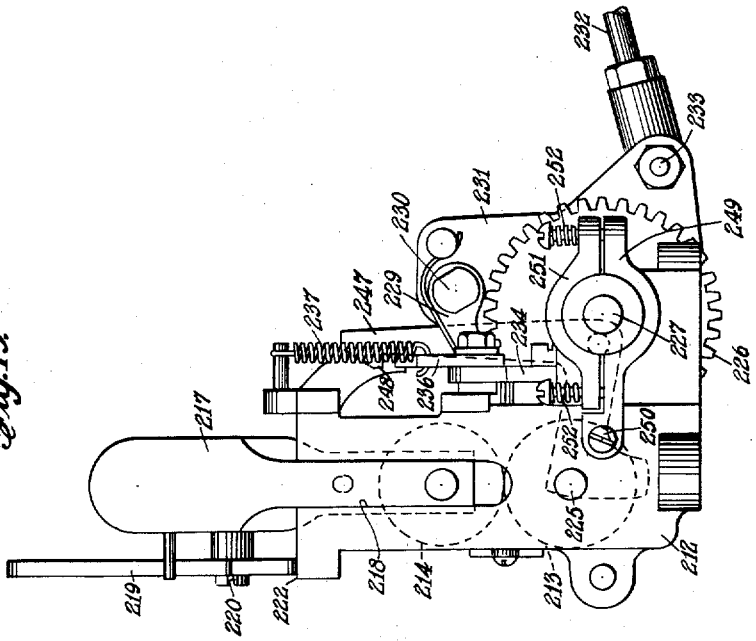
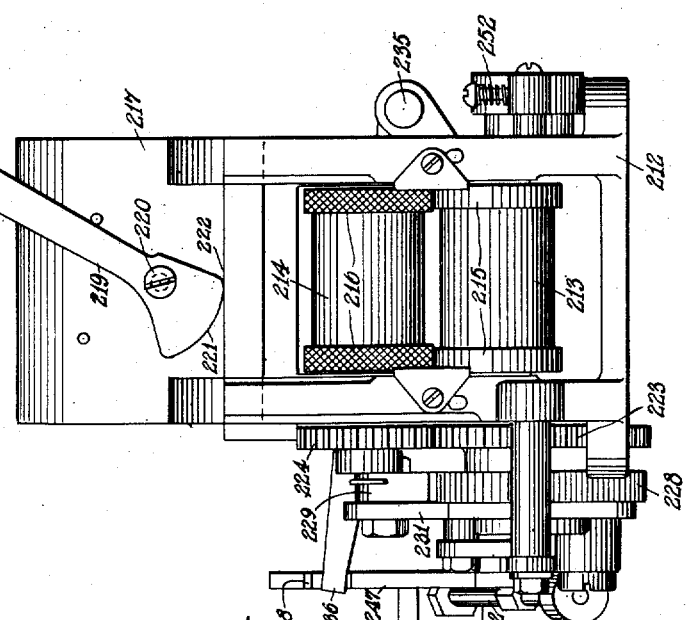

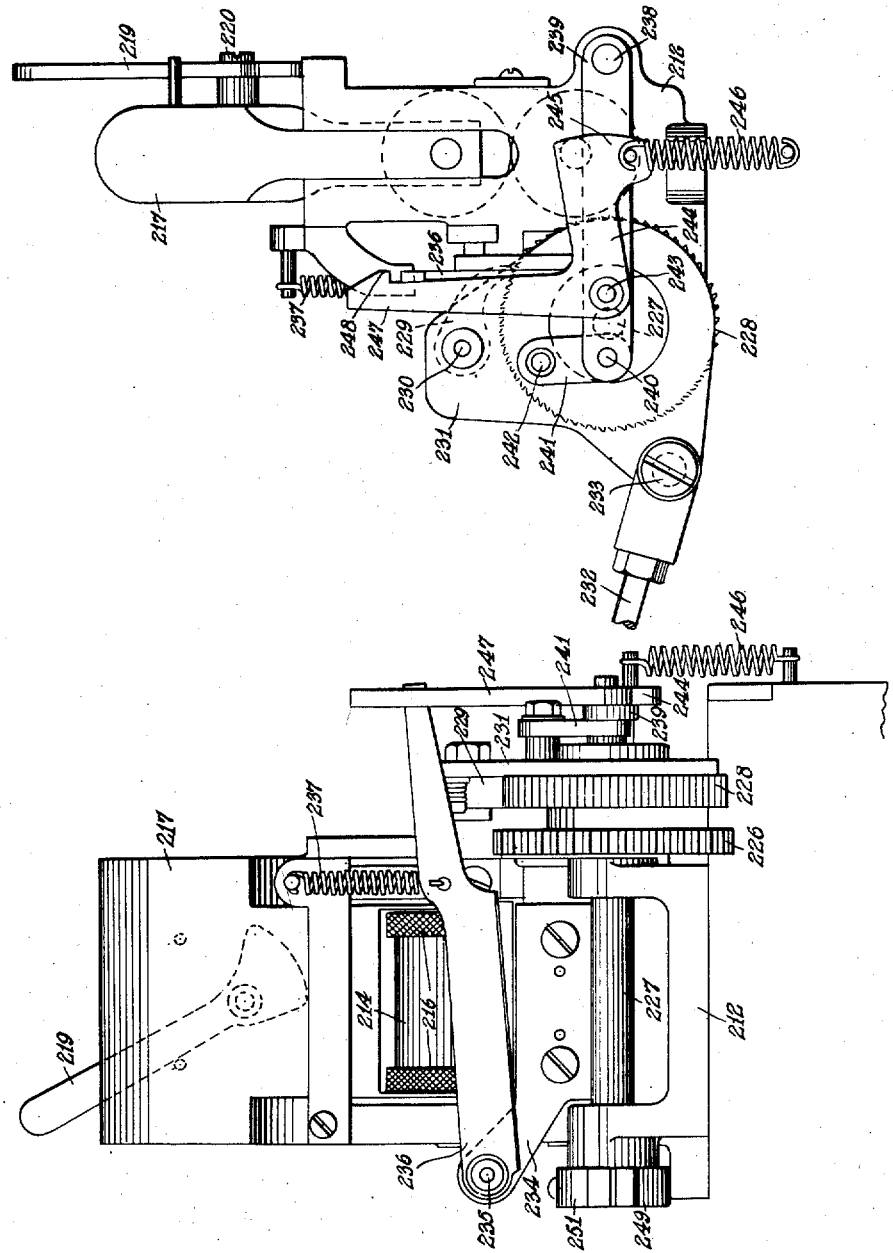
Oct. 19, 1937. J. E. SHARP ET AL 2,096,346
BOTTLE CAP MAKING AND APPLYING MACHINE
Filed Jan. 11, 1932 13 Sheets-Sheet 11

Oct. 19, 1937.  J. E. SHARP ET AL  2,096,346
BOTTLE CAP MAKING AND APPLYING MACHINE
Filed Jan. 11, 1932  13 Sheets-Sheet 12
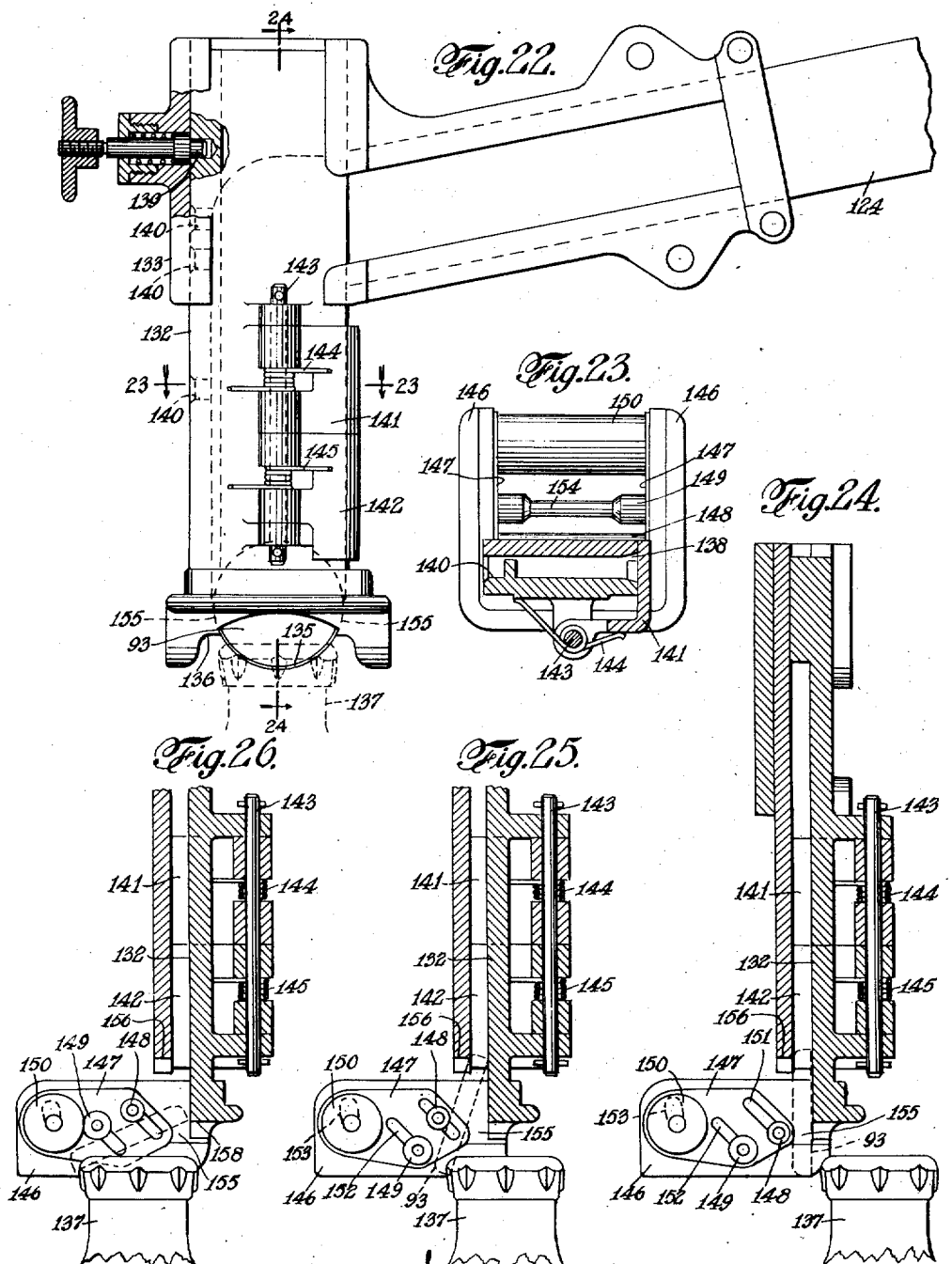

Oct. 19, 1937.    J. E. SHARP ET AL    2,096,346
BOTTLE CAP MAKING AND APPLYING MACHINE
Filed Jan. 11, 1932    13 Sheets—Sheet 13
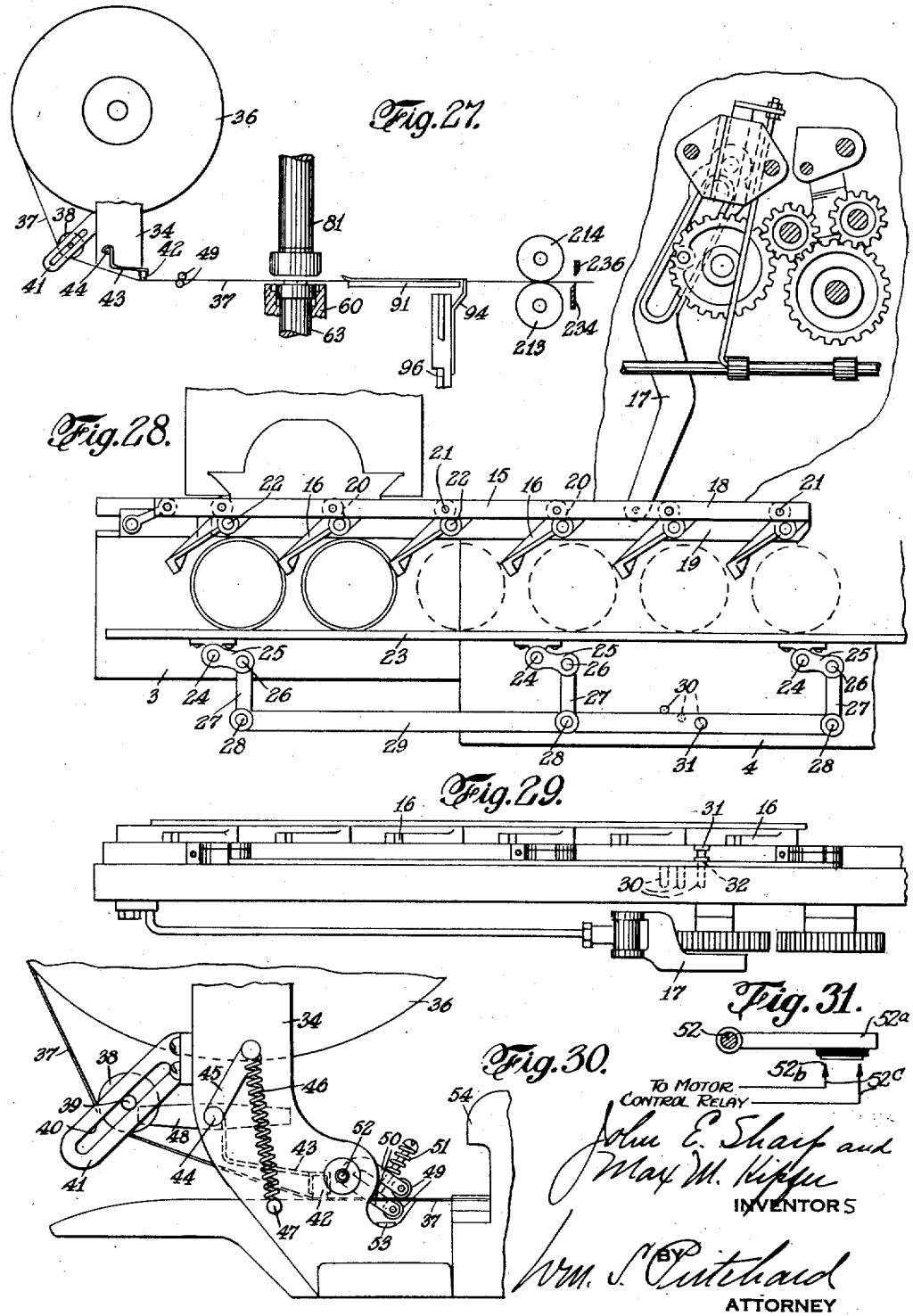

Patented Oct. 19, 1937

2,096,346

UNITED STATES PATENT OFFICE 2,096,346

BOTTLE CAP-MAKING AND APPLYING MACHINE

John E. Sharp, New Kensington, and Max M. Kipfer, Arnold, Pa., assignors to Aluminum Company of America, Pittsburgh, Pa., a corporation of Pennsylvania Application January 11, 1932, Serial No. 585,910

41 Claims. (Cl. 226—84)

This invention relates to a machine for making and applying caps to bottles, and more particularly to a machine for making caps of metal foil and applying the caps to bottles, all in a continuous series of operations, and still more particularly to a machine for making and applying caps to bottles, adapted to be used in combination with a machine for filling bottles.

The invention contemplates making the caps of relatively thin, fragile metal foil, and it will be appreciated that, although it would not be impossible to manufacture such caps on one machine and take a relatively small number of such caps and put them in another independent machine for the purpose of applying them and sealing them on bottles, it would not be found practical to follow such a procedure in rapid and continuous production on account of the ease with which the fragile caps would become crushed, distorted, mutilated or torn if handled rapidly from stacks, hoppers or other automatic means.

It is, therefore, an object of this invention to provide a unitary machine which manufactures bottle caps of thin metal foil and effectively seals them on bottles in a continuous series of operations so as to avoid risk of distorting or tearing the comparatively fragile caps.

Another object of the invention is to provide means for automatically stopping the manufacture of caps in the event of failure in the supply of bottles, and further, to have the cap-applying and sealing mechanism continue to function so that such filled bottles as are on their way to the cap-applying and sealing mechanism will have caps from a reserve supply applied thereto and sealed; and further, to automatically again start the cap manufacturing part of the machine as soon as an additional supply of bottles reaches a certain place on their way toward the cap-applying and sealing mechanism.

A still further object of the invention is to provide means whereby the machine can be quickly and effectively adjusted to accommodate different sizes of bottles.

The above and other objects and advantages will appear from the following description, appended claims, and accompanying drawings forming a part of this specification and in which:

Figure 1 is a plan view of the cap-making and applying machine in combination with a bottle-filling machine;

Figure 2 is a right side view of the clutch trip lever and certain related parts shown in Figure 1;

Figure 3 is a front elevation of the entire machine shown in Figure 1;

Figure 4 is an enlarged plan view of the cap-making and applying machine shown in Figure 1 with some parts omitted;

Figure 5 is a vertical section of the cap-making and applying machine taken on line 5—5 of Figure 4;

Figure 6 is a front elevation of the sealing head mechanism;

Figure 7 is a partial section taken on the line 7—7 of Figure 6 showing the bottle size-adjusting mechanism of the cap-sealing mechanism;

Figure 8 is a vertical section taken on the line 8—8 of Figure 6 showing one of the cap-sealing units;

Figure 9 is an underside plan view of the segmental ring die member shown in Figure 8;

Figure 10 is a sectional view of the segmental ring die member taken on line 10—10 of Figure 9;

Figure 11 is a sectional view taken on line 11—11 of Figure 12, showing the transmission box drive mechanism;

Figure 12 is a rear elevation of the cap-making and applying machine;

Figure 13 is a vertical section on the line 13—13 of Figure 5 showing the clutch mechanism;

Figure 14 is a horizontal section on the line 14—14 of Figure 12 showing the cross-drive for the bottle-filling machine;

Figure 15 is an enlarged vertical section of the cap-cutting and shaping die taken on line 15—15 of Figure 4;

Figure 16:
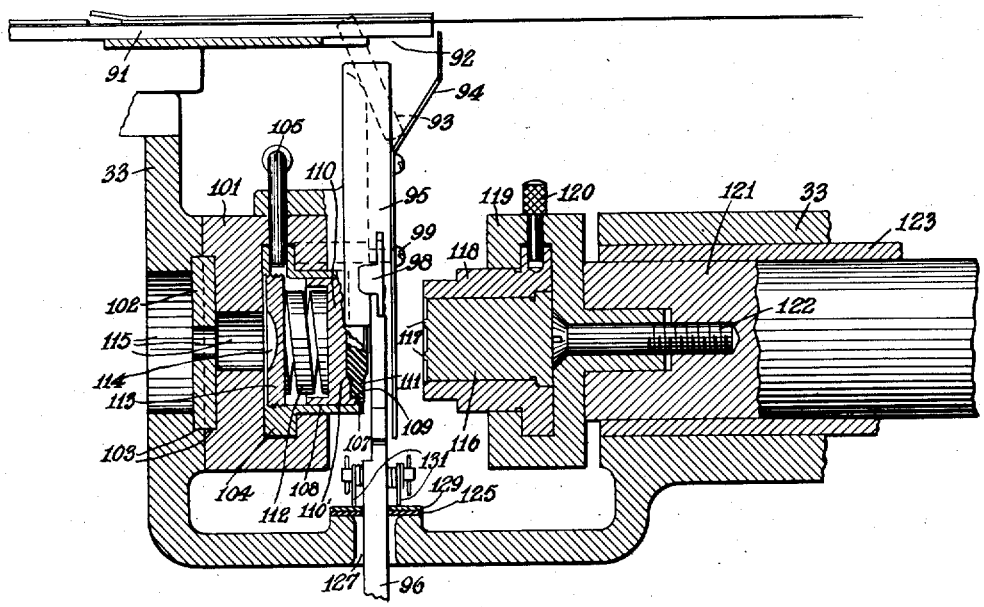
Figure 16 is a vertical longitudinal section of the cap-embossing die with the cap-positioning guide and kick-out lever shown in relation thereto.

Figures 18, 19, 20, and 21 are front, right side, rear, and left side views, respectively, of the foil feed drive and scrap-cutting mechanism;

Figure 22 is an elevation of the cap-applying positioning mechanism;

Figure 23 is a horizontal sectional view taken on line 23—23 of Figure 22;

Figure 24 is a vertical sectional view taken on line 24—24 of Figure 22 showing a bottle about to receive a cap from the cap-applying positioning mechanism;

Figures 25 and 26 show further steps in the progress of the placing of a cap on a bottle moving past the cap-applying positioning mechanism;

Figure 27 is a diagrammatic view illustrating the progress of the foil strip;

Figure 28 is a plan view of the reciprocating bottle conveyor;

Figure 29 is an elevation of Figure 28;

Figure 30 is an enlarged detail view of the upper left portion of Figure 5, showing the foil slack-producing roller, drag, and safety shut-off mechanism;

Figure 31 is a diagrammatic representation of the motor control switch operated in response to failure of the foil strip;

Figure 32 is a diagrammatic plan view of the strip together with the caps in their carrying position; and Figure 33 is a longitudinal section of Figure 32.

The cap-making and applying machine illustrated in the drawings is a self-contained machine or unit and comprises a material-supply station, a cap-punching and forming station, a cap-embossing or printing station, a material-feeding and scrap-cutting station, a cap chute and cap-applying station, and a cap-sealing station. The material-supply station comprises a reel for holding a roll or coil of metal foil strip from which the caps are to be made. This foil strip is intermittently pulled past the cap-punching and forming station and the cap-embossing or printing station, a cap being punched and formed while the strip is at rest and remaining in the hole in the strip from which it was punched, whereupon the formed cap is pulled along by the later feed movement of the strip and permitted to fall down a guide into the mechanism at the embossing or printing station. After being embossed or printed, the cap is pushed into a cap chute where it rolls on its annular edge down the cap chute to the cap-applying station where it is automatically placed on the top of a filled bottle moving past beneath the cap. The filled bottle with a cap resting on its top moves on to the sealing station where the cap is sealed, after which the capped bottle is removed from the sealing station. Commercial strip aluminum .0035" in thickness is very satisfactory for the caps, but other metals or metals faced with paper or some other material may also be used, in which latter case caps would be produced lined with paper or some other suitable material.

Filled bottles may be brought to the cap-making and applying machine by hand or in any other desired way. The cap-making and applying machine illustrated in the drawings is particularly adapted to be used in combination with any suitable filling machine and arranged with a common drive means for both machines, so that empty bottles are conveyed to the filling machine where they are filled and are then conveyed to the cap-applying station and then to the cap-sealing station, all the operations, including the making of the caps, being automatic and interrelated by means of the common drive means.

In the embodiment of the invention illustrated in the drawings, the cap-making and applying machine 1 comprises a main frame or housing 33 (Figures 3, 4, 5, 6, and 12) on which is secured a bracket 34 (Figures 1, 3, 4, and 5) with open bearings 35 (Figures 4 and 5) holding a reel 36 containing a coil or roll of foil 37 which passes underneath a gravity-actuated, slack-providing roller 38 (Figures 5, 27, and 30) having pintles 39 which slide in slots 40 of bearing arms 41 secured to the bracket 34. The foil strip 37 then passes under a felt drag pad 42, which drag felt is secured to a drag arm 43 attached to a pivot shaft 44 having its arm 45 pulled downward by a spring 46 attached at 47 to the bracket 34. The shaft 44 is provided on one end with a handle 48 by which the drag felt 42 can be raised against the action of the spring 46 off of the foil strip. The strip then passes between two rollers 49 on arms 50, having the rollers pressed toward each other by a spring 51. The arms 50 are connected to a switch-operating shaft 52. By virtue of the drag felt 42 and the foil feed means to be later described, the foil strip is normally held substantially straight, as shown in Figure 30, where it passes between the rollers 49. Should the foil break or the supply of foil otherwise fail at this point, the rollers 49 and the arms 50 would swing down to rotate the shaft 52 (Figures 30 and 31) to shut off the electric current to the motor 5 by means of suitable known mechanism. This mechanism may comprise an arm 52a (Figure 31), which may be secured to the shaft 52, and is adapted to engage a pair of contacts 52b for completing the circuit through leads 52c to a suitable motor control relay (not shown), which is adapted to interrupt the operation of the motor when the contacts 52b are closed by suitable rotation of the shaft 52. A block 53 acts as a stop to limit the downward movement of the rollers 49.

The foil then passes to a cap-punching or cap-shearing and cap-forming station comprising a frame 54 (Figures 1, 4, 5, and 15) bolted on the main frame 33, which frame 54 may be made integral as shown, or in separate upper and lower parts bolted together to facilitate machining, if so desired. Secured on the lower portion of the frame 54 is a slotted, tapered bushing 55 adapted to be thrust upwardly for adjustment by means of a nut 56 and locked securely in adjustment by means of a pull nut 57. The bushing 55 is prevented from turning by means of a screw 58 engaging in a longitudinal slot 59. A lower punch 60 is mounted to reciprocate in the bushing 55 by means of a pitman 61 (Figure 5) connected to the lower end of the punch at 62 in a manner that will be later described. A fixed knock-out plunger 63 is located in a central bore in the lower punch 60 and has an opening 64 through which extends transversely a bar or key 65, which has its opposite ends seated in holes in the lower portion 66 of the frame 54, and may be held in position by cotter-pins 67 in its opposite ends. The punch 60 has an elongated hole 68 which permits it to reciprocate a sufficient distance to perform its functions. The opening 64 in the knock-out plunger 63 is preferably made slightly longer than the width of the key 65 so as to permit the plunger to seat properly in the punch 60 when the punch moves to its extreme upper position. Secured to the upper portion of the frame 54 is a bearing support 69 in which is secured a slotted, tapered bushing 70 thrust downward into the desired adjusted position by a screw ring 71 and locked in adjustment by a pull nut 72. The bushing is locked against rotation by a screw 73 engaging in a longitudinal slot 74 in the bushing. A punch ring 75 is mounted on the frame 54 and has seated therein a backing ring 76 normally held pressed downward in the position shown, by means of a spring 77, the pressure of which can be adjusted by means of a ring 78 forced downward by pins 79 engaged by an adjusting nut 80. A ram 81 reciprocates within the bushing 70 and backing ring 76. The ram 81 is connected at 82 to an arm 83 pivoted at 84 to a post 85 secured to or formed integral with the frame 54, as desired. The arm 83 is connected at 86 to a vertical reciprocating rod 87 (Figures 3, 12, and 15) having a spring 88 at its upper end adapted to yield when the rod 87 has caused the ram 81 to move to its lowermost position.

In operation, when the intermittently fed strip of foil is at rest between the upper and lower members of the cap-punching and forming mechanism, the lower punch 60 first moves upward, presses the foil against the backing ring 76, thus gripping the foil between these two members, and continues upward, forcing the ring 76 upward back from the shearing edge 89 of the punch ring 75, thus punching a circular blank from the foil strip. While the blank is thus gripped between the punch 60 and the backing ring 76 with the punch in its uppermost position, the ram 81 moves downwardly and forces the center area of the blank down into the bore 90 of the punch 60 and pulls the entire blank from between the punch and the backing ring, thus forming the cap with a flange extending in a vertical direction. The ram 81 then moves upwardly and the punch 60 moves downwardly. Inasmuch as the knock-out plunger 63 remains in a fixed position continuously, the downward movement of the punch 60 results in the formed cap being lifted out of the bore 90 by means of the knock-out plunger 63.

The flanged cap is left within the hole in the foil strip from which it was punched and, therefore, when the foil is given its next forward step movement, the cap is fed thereby (see Figures 32 and 33). In this manner the cap is slid along through a guide 91 (Figures 16 and 27) until it reaches an opening 92 in the lower surface of the guide, where it falls through, as indicated by the dotted outline of the cap at 93, against a guide plate 94, gradually turning from its original horizontal position to a vertical position and passing downward in the embossing or printing guide 95 with the lower portion of its annular edge resting on the surface 96' (Figure 17) of the knock-out arm or lever 96 and with its side edges between the side surface 97 of the knock-out arm or lever and a finger 98 which is pivoted at 99. The guide 95 has aligned openings in its opposite faces at 100, through which the embossing or printing operations are performed on the cap.

Figure 17:
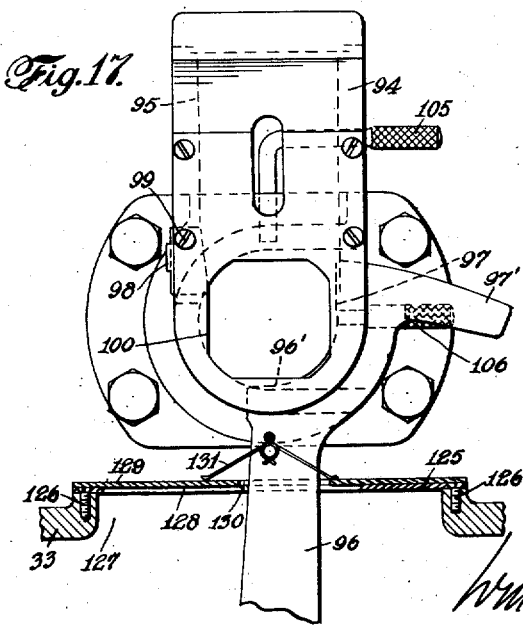
Figure 17 is an elevation viewed from the right of the cap-embossing positioning guide and kick-out lever in Figure 16.

In the form of the device illustrated in Figures 16 and 17, a die holder 101 is secured to the main frame 33 of the machine in any suitable way, with a centering ring 102 resting in aligned bores 103 in the die holder and main frame. Mounted to slide horizontally in the die holder 101 is a die block 104 adapted to be slid horizontally into position from the right of Figure 17 and held in position by a locking pin 105. A handle 106 which is secured to the die block 104 permits ready insertion and removal of the die block from the right side of Figure 17 or the left side of Figure 1. The die block 104 is provided with a bore or opening 107 at the end nearest the guide 95 and with an enlarged counterbore 108 forming an annular shoulder 109. Mounted to slide within the bores 107 and 108 is a backing block 110 having a recess 110' in its outer end, in which is seated a rubber counter or backing member 111. A spring 112 engages between the backing block 110 and an adjusting screw ring 113, having a slot 114, which may be engaged for adjustment by a screw driver inserted through the aligned bores 115. At the other side of the guide 95 an embossing punch 116, having embossing or printing means 117 at its front end, is mounted in a die block 118 adapted to be slid into and out of position in a die holder 119, the same as described for the die block 104. By having the die blocks thus removable from the left of Figure 1, and by placing a second cap-making and applying machine to the left of Figure 1 with a suitable space between the two machines and with the die blocks of the second machine constructed so as to be removable from the right of the second machine, it is possible for an operator to stand in the space between the two machines and have easy access to the embossing dies of both machines. The die block 118 is held locked in position by a removable pin 120. The die holder 119 is secured to an embossing ram 121 by a screw means 122. The embossing ram 121 reciprocates within a bushing 123 in the main frame 33.

In operation, the embossing punch 116 moves forward through the opening 100 and presses the top of the cap against the rubber backing member or counter 111 which yields to conform to the shape of the punch, thus producing the desired lettering on the cap. The punch then withdraws from the guide 95, whereupon the kick-out arm or lever 96 moves to the left (Figure 17) and its surface 97 pushes the cap against the pivoted finger 98 and causes the latter to be swung outwardly to permit the cap to be pushed into the cap chute 124 (Figures 1, 3, and 4), the top surface 97' of the kick-out lever 96 preventing the next cap from falling into operative position until the lever 96 returns to the position shown in Figure 17. A plate 125 (Figures 16 and 17) is secured by screws 126 to the main frame 33 to cover an opening 127 in the frame. This plate 125 has a slot 128 of sufficient width and length to permit the knock-out arm 96 to freely oscillate back and forth to perform its functions. Mounted on top of the plate 125 is a second plate 129 having an opening 130 just sufficiently large to accommodate the knock-out arm 96. This second plate 129 is pressed into contact with the plate 125 by means of springs 131 attached to the kick-out lever 96. Thus, as the lever 96 oscillates back and forth, no substantial opening exists about the lever 96.

As the finished caps are successively pushed into the chute 124 which slopes downwardly, the caps roll on their edges by gravity through the chute and into a cap-applying head or slide 132 (Figures 1, 3, 4 and 22 to 26). The slide 132 is mounted for vertical adjustment within the body member 133 attached to the main frame 33 by means of a bracket 134. A cap 93 normally rests edgewise on the two spaced ledges 155 in the lower end of the head or slide 132 with the lower end 135 of the cap exposed through a recessed portion 136 of the chute so as to be engaged by a bottle 137 moving past the lower end of the chute from right to left (Figures 24, 25, 26). The cap-applying slide 132 has an opening 138 along its right edge (Figure 23) through which the caps enter the hollow interior of the slide from the chute 124. The slide is held in various positions of vertical adjustment to accommodate different sizes of bottles by means of a spring-pressed locking pin 139 adapted to engage in any one of a plurality of holes 140 in the slide. To prevent bottle caps from falling out through the opening 138 when the slide is in its lower adjusted positions, doors 141 and 142 are pivotally mounted on a shaft 143 and normally held closed by means of springs 144 and 145. When the slide is to be moved upward for adjustment, one or more of the doors 141, 142 are swung outwardly against the action of the springs, the locking pin is pulled out of the hole it occupies, and the slide is pushed upward until the proper hole 140 arrives in position to receive the locking pin 139 with one or more of the doors 141, 142 resting against the body member 133. The lower portion of the slide 132 has a pair of spaced arms 146 (Figures 23 to 26) preferably having machined inner faces or pads 147 to form smooth surfaces for the ends of rollers 148, 149 and 150, which have pintles at their ends sliding respectively in slots 151, 152, and 153. The roller 149 has a central, annular, reduced portion 154. The lower rear end of the slide is cut away at 156 so that the roller 148 constitutes the means for holding the cap 93 in position to be engaged by a bottle 137 moving to the left. As the bottle 137 moves to the left, it first engages the lower portion of the cap 93, rocking the lower portion of the cap outward and successively pushing rollers 148 and 149 upward in their retaining slots, with the roller 148 acting as a yieldable fulcrum about which the cap rotates until it passes below the edge 158 (Figure 26) of the slide 132, when the cap is gently placed in position on the top of the bottle. As the rollers 148 and 149 are of light weight, they gently engage the fragile cap and gently place it upon the bottle. As the bottle continues its movement, it is engaged by the heavier cylindrical roller 150 which presses the cap on the top edge of the bottle. While any desired form of bottle and cap may be used, those disclosed in the patent to Sharp et al. No. 1,796,729, March 17, 1931, constitute preferred forms.

As the bottles 137 are moved along two at a time by a reciprocating conveyor as will be later described, they first have the caps placed thereon at the cap-applying station, as just described, and then move along to the cap sealing station where the caps are firmly sealed on two bottles at a time.

The bottles to be sealed rest on wear plates 159 (Figure 7) which in turn rest upon supporting members 160 yieldably pressed upward by springs 161 (Figures 3, 5, 6, and 7) and which members 160 have guide shafts 162 slidable in the main frame 33. A sealing head 163 is bolted to a slide 164 having a nut 165 threadedly engaging the vertical screw shaft 166. The nut 165 carries a bevel gear 167 meshing with a bevel gear 168 on a shaft 169 adapted to be rotated by a crank 170 to turn the nut 165 to adjust the sealing head 163 up or down as desired. At its lower end, the screw shaft 166 has a strap 171 surrounding an eccentric 172 secured on a shaft 281 by means of which the screw shaft 166 receives vertical reciprocating motion.

As the sealing head 163 has two identical sets of parts by which two bottles are sealed by one downward movement of the sealing head, only one of these sets of parts will be described. In the sealing head 163 an adjustable screw-threaded bushing 173 (Figure 8) is adapted to be held in adjusted position by a screw 174 engaging in a slot 175. Through the bushing 173 extends a sealing plunger 176 having a spring 177 engaging between the bushing 173 and a collar 178 on the sealing plunger to normally hold the sealing plunger in its upper position. The enlarged lower portion of the sealing plunger 176 has an annular beveled surface 179 engaging the beveled surface 180 of a segmental ring 181 (Figures 8, 9, and 10) comprising a plurality of separate segments 182, each segment having an oil reservoir 183 with a passage 184 leading to the beveled surface 180 to provide lubrication between the sliding beveled surfaces 180 and 179. The reservoir 183 preferably contains an absorbent fibrous material adapted to retain a quantity of oil and supply it gradually as needed. The lower surfaces 185 of the segments rest upon a retaining ring 186 and have slots 187 slidably engaging pins 188 secured in the retaining ring 186. The segmental ring has an annular channel 189 within which fits a rubber side-pressure or sealing ring 190. A top pressure ring 191 of rubber is supported adjacent the rubber ring 190 by means of a pressure head 192 screw-threadedly connected to studs 193 which extend upward through the enlarged portion of the sealing plunger 176 into engagement with a pressure ring 194 resting against the bushing 173. Pivotally mounted at 195 (Figures 1, 4, 5, and 6) in lugs 196 on the sealing head 163 is a rocker arm 197 having an adjustably secured bolt 198 for engagement with the top of the sealing plunger 176. Secured to the side of the main frame of the machine is a bolt 199 (Figures 5 and 6) on which are pivotally mounted a plurality of bumper blocks 200 and 201 having spaced pairs of lugs 202 and 203 respectively, by which the bumper blocks are normally held in vertically aligned superposed position by the spaced lugs 202 on the bumper block 200 engaging the sides of the bumper block 201, and by the spaced lugs 203 on the bumper block 201 engaging the sides of the fixed bumper block 205, which latter is bolted to the main frame 33 of the machine. Between the head of the bolt 199 and the top of the bumper block 200 is a spring 204 which permits either one or both bumper blocks 200, 201 to be lifted vertically to release their lugs and enable the bumper blocks to be swung outwardly on bolt 199 as a pivot so that, depending on what size of bottle is to be sealed, the bumper block 200 may be the one to engage the rocker arm 197; or by swinging the bumper block 200 to one side, the bumper block 201 will constitute the operating block to be engaged by the rocker arm 197; or by also swinging the bumper block 201 to one side, a fixed bumper block 205 will be the one to engage the rocker arm 197. In order to adjust the sealing head for different-sized bottles, the shaft 281 (Figures 5, 6, and 7) carrying the eccentric 172 will first be rotated to bring the arrow 206 on the eccentric opposite the arrow 207 on the strap 171, whereupon the crank 170 will be rotated until the pointer 208 comes opposite the proper one of the marks 209 on the main frame of the machine.

In operation, as the eccentric 172 rotates and causes the sealing head 163 to move downwardly, the top rubber pressure ring 191 engages a cap and presses it firmly down on the top of a bottle, and the outer end of the rocker arm 197, by engagement with one of the bumper blocks, causes the sealing plunger 176 to move downwardly relative to the head 163. This movement of the sealing plunger 176 relative to the head 163 causes the beveled surface 179 to ride along the beveled surface 180 of the segmental pressure ring 181, thereby causing the segmental pressure ring to contract inwardly, which latter action causes the rubber side-pressure or sealing ring 190 to contract inwardly to firmly press the sides of the seal on the bottle top. Upon completion of the sealing operation, the sealing head 163 rises upwardly, thus moving the rocker arm 197 up out of contact with the bumper block, and the spring 177 lifts the sealing plunger 176 upwardly relative to the sealing head so that the beveled surface 179 of the sealing plunger 176 moves upwardly and permits the segmental pressure ring 181 to be expanded by the rubber sealing ring 190, ready for the next sealing operation. The sealed bottles are forced along past the sealing head and on to the table 210 within the guard rail 211 by a reciprocating conveyor to be later described.

The means by which the foil strip is given a step-by-step or intermittent feed comprises a frame or bracket 212 (Figures 4, 5, 18, 19, 20, and 21) secured to the main frame 33 and has a pair of feed rolls 213 and 214. The lower feed roll 213 is mounted in the frame proper and has its end portions 215, which grip the foil, formed plain. The upper roll 214 has its foil-gripping portions 216 knurled to cooperate with the plain portions 215 of the roll 213 for gripping and feeding the foil. The upper roll 214 is journaled in a supporting member or holder 217 mounted to slide vertically in ways 218 in the bracket 212. The foil strip is gripped for feeding by the rolls 213 and 214 by virtue of the weight of the upper roll 214 and its holder 217. A cam lever 219 pivoted at 220 on the upper roll supporting member or holder 217 is adapted to be swung by hand to cause its cam surface 221 to press onto the surface 222 of the bracket 212 to lift the holder 217 to remove the upper roll 214 from feeding engagement with the foil strip. The feed rolls 213 and 214 have intermeshing gears 223 and 224 by which they are made to rotate in unison as well as to provide a drive for the upper roll 214. The gear 223 is mounted on a shaft 225 of the roll 213 and is in driven engagement with a gear 226 secured on a shaft 227. Also secured to the shaft 227 is a ratchet wheel 228 whose teeth are adapted to be engaged by a ratchet finger or pawl 229 pivoted at 230 on a ratchet lever 231 mounted to oscillate on the shaft 227 and to be given its oscillating motion by a reciprocating rod 232 pivoted to the lever at 233. Secured to the bracket 212 at the rear of the feed rolls is a lower shear knife 234 to which is pivoted at 235 an upper shear knife 236 normally held in raised position by a spring 237. Pivoted at 238 on the bracket 212 is a link 239 having its other end pivoted at 240 to a second link 241, which latter link has its other end pivoted at 242 to the ratchet lever 231. Pivoted at 243 on the link 239 is a bell-crank shaped trigger 244 having its lower arm 245 pulled downwardly by a spring 246, thus throwing the upper arm 247 of the trigger against the end of the shear knife 236 and thus keeping the shear knives in good cutting engagement with each other. A tooth 248 on the trigger serves to pull the shear knife 236 down to perform the shearing operation on the skeleton foil strip. A lever 249 pivoted to the bracket 212 at 250 forms a brake shoe which cooperates with a brake shoe 251 to frictionally grip the shaft 227 by virtue of the action of springs 252 to prevent overtravel of the shaft 227 during operation of the feed mechanism. When the rod 232 reciprocates to the left (Figure 21), the pawl 229 actuates the ratchet wheel 228 to cause the feed rolls to feed the strip forward one step. During this feed movement, the link 239 swings upwardly about its pivot 238 carrying the trigger tooth 248 upward away from the shear knife 236. When the rod 232 moves to the right, the pawl 229 rides idly over the ratchet wheel 228 and the link 239 swings downwardly to cause the trigger tooth 248 to engage the end of the shear knife 236 to swing the shear knife down and sever the portion of foil extending between the shear knives. The severed pieces of scrap foil slide down the chute 253 (Figure 1) into a scrap box or bin 254.

The electric motor 5 is connected by means of a friction clutch 255 (Figure 4) to a shaft 256 (Figure 11) journaled in ball bearings 256' secured in the transmission housing 257 (Figures 3, 4, 11, and 12), which housing is suitably attached to the main frame 33 of the machine. The shaft 256 has keyed or formed thereon two different-sized drive pinions 258 and 259 which mesh respectively with different-sized spur gears 260 and 261, which latter two gears are rotatably mounted on a shaft 262 journaled in ball bearings 262' secured in the housing 257. The gears 260 and 261 are provided with key-ways 263 and 264 respectively with a separator ring 265 between the two gears. A spring pressed slidable key 266 is pivoted at 269 to an operating rod 270 provided with a knob 271. Keyed to the shaft 262 is a drive gear 272 meshing with an idler gear 273 which rotates on a ball bearing 273' secured on a fixed shaft 274 having its ends secured in the housing 257. By sliding the key 266 so as to cause it to engage one or the other of the gears 260 and 261, two different speeds can be given to the shaft 262 by virtue of the different gear ratios between the sets of gears 258, 260 and 259, 261 respectively. It will also be observed that by moving the slidable key 266 to an intermediate position where it rests on the separator ring 265, and thus is free from keying engagement with the gears 260 and 261, the shaft 256, together with the driving motor, will be out of driving engagement with the shaft 262. This permits the shaft 262 to be more readily turned by hand in either direction by means of the hand wheel 275 to move or shift the positions of various parts of the machine for any purpose such as readily threading the foil strip through the machine.

The gear 273 is in driving engagement with a ring gear 276 (Figure 5) which is keyed to a sleeve ring 277 which is rotatably mounted on ball bearings 277' and a shaft 278 which is mounted at its ends in ball bearings 278' secured in the main frame 33. The sleeve ring 277 has formed or secured thereon a gear 279 which meshes with a gear 280 which is secured to a shaft 281 which is mounted in two end roller bearings 281' secured in the frame 33, and in a center ball bearing 282' mounted on the frame 33. The gear 280 is twice the diameter of the gear 279 for a reason which will be later explained. Keyed to the shaft 278 is a clutch body 282 having a pawl 283 (Figures 5 and 13) pivoted therein and pressed by a spring pressed plunger 284 to cause the pawl 283 to engage a slot 285 in a clutch ring 286 under certain conditions. This clutch ring 286 is secured to the sleeve ring 277 by means of a pin 287 to transmit motion from the rotating sleeve ring 277 to the clutch body 282 which is keyed to the shaft 278 and thus to rotate the latter. When the clutch finger 288 occupies the position shown in full lines in Figure 5, it holds the pawl 283 (Figure 13) inward out of engagement with the slot 285 in the constantly rotating clutch ring 286, thus holding the shaft 278 out of driving engagement. To prevent overtravel of the shaft 278, a spring pressed friction brake 289 is anchored to the main frame 33 of the machine at 290 and engages the brake rim 291 of the clutch body. When the clutch finger 288 moves to the dotted line position shown in Figure 5 it permits the pawl 283 to have driving engagement with the slot 285 of the rotating clutch ring 286. The clutch finger 288 is secured to a shaft 292 pivotally mounted at its ends in bearings 292' in the main frame 33, to which shaft 292 a trip arm 293 (Figures 1, 2, and 13) is secured. A tension spring 294 is connected between the outer end of the trip arm 293 and the main frame 33 of the machine. Pivoted at 295 on the trip arm 293 is a swivel 296 to which is attached a cable 297 which passes over a pulley 298 mounted in a pulley bracket 299 fastened to the main frame of the machine. The cable 297 passes around a pulley 300 (Figure 1) and is attached to a sector arm 301 which is secured to an upright shaft 302 (Figures 1 and 3) which is pivoted at its lower end to a bracket 303 which may be mounted, for example, on a bottle-filling machine or on a conveyor which feeds filled bottles to the cap-applying head. The sector arm 301 has a pin 304 adapted to engage the bracket 303 to limit the rotational movement of the shaft 302. Secured to the upper end of the shaft 302 is a bottle-engaging arm 305 adapted to be engaged by the bottles as they pass by the arm 305. When the supply of bottles continues past the arm 305 so as to hold it swung outward, the cable 297 holds the trip arm 293 up against the action of the spring 294 with the clutch finger 288 in the dotted line position shown in Figure 5 to cause the shaft 278 to be driven. When the supply of bottles fails, the arm 305 is caused to swing inwardly through the action of the spring 294 pulling the trip arm 293 downwardly, thus turning the shaft 292 sufficiently to bring the clutch finger 288 into engagement with the pawl 283 to disengage the clutch and cause the shaft 278 to stop rotating. Inasmuch as the sealing head operates to seal two bottles at a time, whereas the cap-forming mechanism only makes one cap at a time, it is necessary to have the cap-making mechanism operate at twice the speed of the sealing mechanism. The shaft 281 which drives the sealing mechanism through the eccentric 172 and strap 171 (Figures 3, 5, 6, and 7) therefore has the gear 280 (Figure 5) twice the diameter of the gear 279, so that the shaft 278 which drives the cap-making mechanism will rotate at twice the speed of the shaft 281. Secured on the shaft 278 is a cam 306 which operates the pitman 61 which is connected at 62 to the punch 60. Inasmuch as the ram 81 and the punch 60 operate in alignment, it is desirable to have the reciprocating rod 87 (Figure 15) actuated by cam mechanism in the same plane as the cam 306 on the shaft 278. To accomplish this and get the necessary number of operations so that the ram 81 will operate as often as the punch 60, a cam 307 having two opposite cam surfaces 308 and 309 (Figures 5 and 12) is secured on the shaft 281 which rotates at half the speed of the shaft 278. This double cam 307 actuates a lever arm 310 pivoted on the frame of the machine at 311 and is pivotally connected at 312 to the reciprocating rod 87 (Figures 12 and 15) which actuates the ram 81. The lever 310 is normally held up in contact with the cam 307 by a spring 310'. Secured to the shaft 278 is a bevel gear 313 meshing with another bevel gear 314 secured on a vertical shaft 315 mounted in ball bearings 315' secured in the main frame 33. Secured on the shaft 315 is a shuttle cam 316 which operates the arm 317 of a pivoted rock shaft 318 mounted in bearings 318' secured on the main frame 33, and to which shaft 318 is secured the previously described knock-out arm or lever 96. A spring 317' holds the arm 317 down in contact with the cam 316. Further up on the shaft 315 is secured an eccentric 319 which actuates a strap 320 to reciprocate the previously referred to embossing ram 121 (Figures 5 and 16). On the upper end of the shaft 315 is a bevel gear 321 meshing with another bevel gear 322 mounted on a shaft 323 to which is secured an arm 324 (Figure 12) which is pivoted to and reciprocates the previously referred to rod 232 (Figures 5, 12, 19, and 21) for actuating the strip-feed and shear mechanism.

As previously stated, the cap-making and applying machine is a self-contained machine or unit which may be operated by supplying filled bottles to it in any desired way. In practice, most economical results will ordinarily be obtained by arranging the cap-making and applying machine to operate in conjunction with a suitable bottle-filling machine, and accordingly, such a bottle-filling machine has been illustrated in Figures 1 and 3 of the drawings. The bottle-filling machine illustrated is of the type shown and described in the patent to Strandt et al., No. 1,716,869, June 11, 1929. In order to have the cap-making and applying machine 1 operate properly in conjunction with the bottle-filling machine 2, the capping heads are removed from the bottle-filling machine and the two machines are connected together by means of a suitable connecting or floor plate (not shown) so as to hold the tables 3 and 4 of the two machines in alignment, and both machines are driven from a common power source, such as a motor 5, on the cap-making and applying machine. The clutch mechanism controlling the motor of the bottle-filling machine shown in the Strandt Patent No. 1,716,869 is thrown into neutral position and the sprocket on the main drive shaft of the bottle-filling machine is connected by a chain (not shown) to a sprocket 6 (Figures 4, 12, and 14) on the cap-making and applying machine. The sprocket 6 is secured on a cross-drive shaft 328 mounted in ball bearings 329 secured in a housing 330 bolted to the side of the main frame 33. On the shaft 328 is secured a bevel gear 327 which meshes with the bevel gear 326 (Figure 5) secured to the sleeve ring 277 by the pin 325, which sleeve ring is driven from the motor 5 through the mechanism previously described.

The filled bottles may be conveyed from the bottle-filling machine to the cap-making and applying machine by any suitable conveying means. The particular conveying means illustrated in the drawings comprises a reciprocating conveyor 15 (Figures 1, 28, and 29) having arms or fingers 16 which sweep the bottles two at a time along the table to the cap-making and applying unit.

The particular mechanism illustrated in the drawings for operating the conveyor 15 comprises an oscillating arm 17 driven by suitable gearing, as shown, and as more particularly described in the patent to Strandt No. 1,174,453, March 7, 1916. As the arm 17 moves to the right (Figure 28) it pulls a bar 18 to which it is pivotally connected, thus causing the bar 18 to move to the right relative to a bar 19, swinging arms 20 pivoted to the bar 18 at 21 about the pivots 22 on the bar 19, and thus swinging the fingers 16 out of contact with the bottles. When the lever 17 moves to the left, it first slides the bar 18 a certain distance in advance of the bar 19 to cause the fingers 16 to be swung into position to engage bottles. Further movement of the lever 17 to the left results in movement of the bottles for a distance equal to twice the distance between two fingers 16. To provide adjustment for different sizes of bottles, a guide plate 23 is pivoted at 24 to crank arms 25, which latter are pivoted to the tables 3 and 4 at 26 and have their arms 27 pivoted at 28 to a link bar 29. The table 4 is provided with a plurality of holes 30 into which a pin 31 is adapted to be inserted through a hole 32 in the link bar.

The operation of the machine is as follows:

The slidable key 266 (Figure 11) is shifted to neutral position to rest on the separator ring 265 to unclutch the shaft 262 from driving engagement with the motor 5. The hand wheel 275 is then turned any necessary amount in either direction to retract the ram 81 and punch 60, if necessary, to provide a clear passage between them for the strip of foil. The lever 219 is swung to raise the feed roll 214. The foil strip 37 is pulled from the reel 36 and passed under the slack-providing roller 38. The handle 48 (Figure 30) is then turned to lift the drag felt 42 to permit the strip to be passed thereunder. The arms 50 are then spread apart to permit the strip to be passed between the rollers 49, the strip then being drawn between the ram 81 and the punch 60 and pushed between the feed rolls 213 and 214, whereupon the cam lever 219 is swung in the opposite direction to lower the feed roll 214 into engagement with the foil strip. The slidable key 266 is then moved into driving engagement with either gear 260 or 261 depending on the speed desired, whereupon the motor 5 is started in operation. Further variation in speed may be obtained by using a suitable variable-speed motor.

As the filled bottles come in contact with the arm 305, this arm is swung and held outward to actuate the cable 297 to pull the trip arm 293 upwardly in such a manner that the clutch finger 288 is swung out of engagement with the clutch pawl 283 (Figure 5) so that the pawl will engage the notch 285 (Figure 13) in the clutch ring 286 which is secured to the sleeve ring 277 by means of the pin 287. Since the clutch body 282 is keyed to the shaft 278 and is likewise positively connected to the sleeve ring 277 through the medium of the engagement of the pawl 283 with the notch 285 in the clutch ring 286, positive connection is established between shafts 281 and 281 by means of the engagement of gear 279, formed on sleeve ring 277, with the gear 280. This constitutes a positive drive between the shafts 281 and 278, whereupon the manufacture of caps will start.

It will be noted on inspection of Figures 5, 11, and 13 that the hand or manual operation of hand wheel 275 will rotate the shaft 281 (Figure 5) and, when the clutch body 282 is positively engaged with the ring 286, also shaft 278. The clutch body 282 will positively engage the ring 286 when the bottle feeler arm 305 extends outwardly as viewed in Figure 1. The presence of a bottle in contact with the feeler arm 305 will hold the aforementioned clutch in engagement. Thus, it is apparent that, when the feeler arm 305 is pulled outwardly as viewed in Figure 1 or caused to assume this position by the presence of a bottle in contact with said feeler arm, the hand wheel 275 can be manually manipulated to operate the means to feed strip material and the cap-sealing means independently of the motor-driven means.

In the making of the caps, the feed rolls 213 and 214 pull the foil strip a distance of one step through the machine. The slack-providing roller 38 moves upward in the slots 40, but, as soon as the feed movement ceases, the roller 38 by its weight gradually pulls more foil off the reel until the roller 38 again rests in the bottom of the slots 40 so as to provide ample slack between the reel 36 and the drag felt 42 ready for the next step-feed movement of the foil, thus minimizing the breaking or tearing of the foil strip due to the inertia of the heavy reel of foil. While the foil strip is stationary, a blank is punched therefrom and formed at the cap-punching and forming station by the mechanism previously described as mounted in the frame 54. At the next step-feed movement, the formed cap is pulled along by the foil strip by virtue of its resting in the hole in the strip from which it was punched. When the cap reaches the embossing station it passes down into the vertical embossing guide 95 as previously described. The skeleton foil strip from which caps have been punched and formed continues straight on through the feed rolls 213 and 214 to be cut into short lengths as scrap by the shear knives 234 and 236, whence the pieces of scrap pass down the scrap chute 253 into the scrap bin 254. After the cap is embossed as previously described, it is pushed by the kick-out lever 96 into the downwardly sloping cap chute 124 along which it rolls to the cap-applying station. As the cap chute 124 is of substantial length, it accommodates a number of finished caps and acts as a reserve supply for a purpose to be presently described.

As the filled bottles are moved along two at a time by the fingers 16 of the reciprocating conveyor 15, the bottles pass beneath the cap-applying head or slide 132 and a cap is automatically applied to the top of each bottle as previously described. When two filled bottles with the caps resting thereon arrive under the double sealing head 163, the latter moves down and seals the caps of both bottles by means of the two sealing plungers 176 and related parts, as previously described. After the bottles are sealed, they are pushed along onto the table 210 within the guard rail 211.

Should the supply of foil break or fail between the drag felt 42 and the feed rolls 213 and 214, the rollers 49 with the arms 50 will swing down to cause the shaft 52 to shut off the current supply to motor 5 and thus stop the operation of the entire mechanism until after the foil supply is again placed in operating condition. Should the bottle supply fail, the bottle-engaging arm 305 will swing inwardly and cause the cable 297 to release the trip arm 293 which is then pulled down by the spring 294 to unclutch the shaft 278 by means of the mechanism previously described. This results in immediate stoppage of the manufacture of bottle caps, but inasmuch as the capping heads are operated from the shaft 281 which continues in operation, the filled bottles which have passed beyond the bottle-engaging arm 305 will first have caps applied thereon from the reserve supply in the cap chute and will then be properly sealed by the capping head 163. When the supply of bottles again reaches the arm 305, the arm will be swung outwardly to actuate the clutch, as previously described, to again start the shaft 278 in operation, thus again starting the manufacture of caps which continues as long as the supply of bottles continues to pass by the arm 305 and hold it swung outward.

The invention may be embodied in other specific forms without departing from the spirit or essential characteristics of the invention and the present embodiment is, therefore, to be considered in all respects as illustrative and not restrictive, the scope of the invention being indicated by the appended claims rather than by the foregoing description, and all changes which come within the range of equivalents of the claims are intended to be embraced therein.

We claim:

1. A device of the class described comprising cap-making means, cap-applying means, conveyor means for moving a row of bottles to the cap-applying means, means responsive to an interruption in said row of bottles to cause a corresponding interruption in the operation of said cap-making means, and means to cause the conveyor means and cap-applying means to continue to function to apply a cap to the last bottle in said row, whereby all the bottles passing through the machine receive a cap.

2. A device of the class described comprising cap-making means, cap-storing and supplying means, cap-applying means, conveyor means for moving a row of bottles to the cap-applying means, means responsive to an interruption in said row of bottles to cause a corresponding interruption in the operation of the cap-making means while the conveyor means continues in operation to feed the row of bottles to said cap-applying means, and means whereby said cap-applying means continues to function while bottles are fed thereto by said conveyor means so as to apply a cap to all the bottles passing through said machine.

3. A device of the class described comprising cap-making and cap-applying mechanisms, conveyor means for moving a row of bottles to the cap-applying mechanism, power means for operating both mechanisms and the conveyor means, said power means including a power shut-off device for the cap-making mechanism, and control means normally held in such position by the row of bottles as to cause the cap-making mechanism to operate, said control means being adapted to move to such other position by an interruption of the row of bottles as to cause the power shut-off means to be actuated to stop the cap-making mechanism, and means whereby said cap-applying means continues to function to apply a cap to the last bottle in said row ahead of said interruption in said row.

4. A device of the class described comprising cap-making and cap-sealing mechanisms, means to supply strip cap material to said cap-making mechanism, driving means for both of said mechanisms, and means operable in response to failure of the strip supply adapted to interrupt said driving means.

5. A device of the class described comprising cap-making means, means adapted to feed strip material to said cap-making means, shut-off means adapted to shut off said cap-making means, and means operable in response to failure or breakage of the strip to actuate said shut-off means.

6. A device of the class described comprising cap-making means, means adapted to feed strip material to said cap-making means, tensioning means adapted to maintain the strip material under tension, and shut-off means between the tensioning means and the cap-making means adapted to be operated by failure or breakage of the strip material to shut off the cap-making means.

7. A device of the class described comprising cap-making means, intermittent feed means adapted to feed strip material to said cap-making means, and yieldable means adapted to supply strip material for said cap-making means between the feed times of the intermittent feed means.

8. A device of the class described comprising cap-making means, intermittent feed means adapted to feed strip material to said cap-making means, and gravity-operated means adapted to supply strip material for said cap-making means between the feed times of the intermittent feed means.

9. A device of the class described comprising cap-making means, intermittent feed means adapted to feed strip material to said cap-making means, yieldable means adapted to supply strip material for said cap-making means between the feed times of the intermittent feed means, tensioning means adapted to maintain tension in the strip material between the yieldable means and the intermittent feed means, means to shut off the cap-making means, and means adapted to be operated in response to loss of tension of the strip material to actuate said shut-off means.

10. A device of the class described comprising feed means for strip material, a motor, change-speed gears between the motor and the feed means, and gear-change means adapted to render any one of said change-speed gears operative or to render all of said change-speed gears idle whereby the feed means can be hand-operated without turning the motor.

11. A device of the class described comprising feed means for strip material, a motor-driven gear shaft, a change-speed shaft having a plurality of change-speed gears normally freely rotatable thereon and in engagement with the motor-driven gear shaft, and a slidable member adapted to be shifted to render any one of said change-speed gears operative, or to be shifted to a disengaged position to render all of said change-speed gears idle whereby the feed means can be hand-operated without turning the motor.

12. A device of the class described comprising sealing means for sealing two bottles at a time, a first shaft for driving said sealing means, cap-making means for forming one cap at a time, said cap-making means comprising two separately operated members, a second shaft driven at twice the speed of the first shaft and operating one member of said cap-making means, and operative connections between said first shaft and the other member of said cap-making means.

13. A device of the class described comprising sealing means for sealing two bottles at a time, a first shaft for driving said sealing means, cap-making means for forming one cap at a time, said cap-making means comprising two separately operated aligned members, a second shaft driven at twice the speed of the first shaft and operating one of said aligned members, and operative connections between said first shaft and the other aligned member including a double-speed cam.

14. A device of the class described comprising cap-making means for punching and forming flanged caps from a strip of material and leaving the flanged caps in the holes in the strip from which they are punched, whereby upon feeding of the strip the latter will engage the flange and positively convey the caps, feed means for feeding the strip with the flanged caps in the holes thereof, and guide means intermediate the cap-making means and the feed means and beneath the strip adapted to receive the flanged caps from the holes in the strip and guide the further passage of said caps independently of said strip.

15. A device of the class described comprising cap-making means for punching and forming flanged caps from a strip of material and leaving the flanged caps in the holes in the strip from which they are punched, whereby upon feeding of the strip the latter will engage the flange and positively convey the caps, feed means for feeding the strip horizontally with the flanged caps in the holes thereof, and guide means intermediate the cap-making means and the feed means and beneath the strip and so constructed that as the strip moves forward over the guide means the forward edge of the flanged cap is permitted to sink down further and further until the cap assumes an upright position in the guide means.

16. A device of the class described comprising cap-applying means adapted to support a cap in upright edgewise position with the lower end of the cap exposed to be engaged by the top of a bottle moving horizontally, and a plurality of yieldable spaced and independently functioning rollers to successively engage the side of the cap opposite from the side the bottle engages, said yieldable rollers and moving bottle top cooperating to cause the cap to be applied on the bottle top as the bottle moves past the cap-applying means.

17. A device of the class described comprising cap-applying means adapted to support a cap in upright edgewise position with the lower end of the cap exposed to be engaged by the top of a bottle moving horizontally, and gravity-actuated rollers adapted to successively engage the side of the cap opposite from the side the bottle engages, said gravity-actuated rollers and moving bottle top cooperating to cause the cap to be applied on the bottle top as the bottle moves past the cap-applying means.

18. A device of the class described comprising cap-applying means adapted to support a cap in upright edgewise position with the lower end of the cap exposed to be engaged by the top of a bottle moving horizontally, and a plurality of different-sized rollers adapted to successively engage the side of the cap opposite from the side the bottle engages, said rollers and moving bottle top cooperating to cause the cap to be applied on the bottle top as the bottle moves past the cap-applying means, the largest roller being the one to engage the cap last.

19. A device of the class described comprising a cap-applying support, cap-delivering means connected to said support, a hollow cap-applying slide vertically adjustable on said support and having its hollow interior adapted to communicate with said cap-delivering means in various positions of vertical adjustment of said slide.

20. A device of the class described comprising a cap-applying support, cap-delivering means connected to said support, a hollow cap-applying slide vertically adjustable on said support and having side opening means adapted to communicate with said cap-delivering means in various positions of vertical adjustment of said slide, and removable cover means for the lower portion of said side opening means.

21. A device of the class described comprising a cap-applying support, cap-delivering means connected to said support, a hollow cap-applying slide vertically adjustable on said support and having side opening means adapted to communicate with said cap-delivering means in various positions of vertical adjustment of said slide, and a plurality of removable covers for the lower portion of said side opening means.

22. In a device of the class described, cap-applying means adapted to support a cap in position to be engaged by the top of a moving bottle, means cooperating with the moving bottle top to cause the cap to be applied on the bottle top as the bottle moves past the cap-applying means, conveyor means to move bottles past said cap-applying means, cap-making means adapted to supply caps to said cap-applying means, and means controlled by the supply of bottles to interrupt said cap-making means when the supply of bottles fails, said conveyor means being adapted to continue to feed bottles past said cap-applying means, whereby caps are applied to all bottles remaining in the machine after said supply fails.

23. In a device of the class described, cap-applying means adapted to support a cap in position to be engaged by the top of a moving bottle, means cooperating with the moving bottle top to cause the cap to be applied on the bottle top as the bottle moves past the cap-applying means, conveyor means to move bottles past said cap-applying means, cap-making means adapted to supply caps to said cap-applying means, and means controlled by the supply of bottles to cause said cap-making means to operate a sufficient length of time prior to passage of the first bottle under said cap-applying means to produce a supply of caps at least equal in number to the bottles remaining in the machine after the supply fails, whereby caps are applied as the machine is cleared of bottles.

24. In a device of the class described, cap-applying means adapted to support a cap in position to be engaged by the top of a moving bottle, means cooperating with the moving bottle top to cause the cap to be applied on the bottle top as the bottle moves past the cap-applying means, conveyor means to move bottles past said cap-applying means, cap-making means adapted to supply caps to said cap-applying means, cap-sealing means adapted to seal the caps thus applied, and means controlled by the supply of bottles to interrupt said cap-making means when the supply of bottles fails, said conveyor means being adapted to continue to feed bottles past said cap-applying means, whereby caps are applied to all bottles remaining in the machine after said supply fails, said cap-sealing means being adapted to continue to operate independently of the operation of said cap-making means to seal all of said caps.

25. In a device of the class described, cap-applying means adapted to support a cap in position to be engaged by the top of a moving bottle, means cooperating with the moving bottle top to cause the cap to be applied on the bottle top as the bottle moves past the cap-applying means, conveyor means to move bottles past said cap-applying means, cap-making means adapted to supply caps to said cap-applying means, and means controlled by the supply of bottles to cause said cap-making means to operate a sufficient length of time prior to passage of the first bottle under said cap-applying means to provide a finished cap in said cap-applying means for application to said first bottle.

26. In a device of the class described, cap-making means including means to feed a strip of material, means to punch caps from said strip, means to form said caps with flat tops and side flanges and to leave said caps in inverted position in the holes in the strip from which they are punched, and guide means engaging the inverted tops of said caps to guide the same as the caps are drawn along with the strip during the feeding of the strip.

27. In a device of the class described, cap-making means including means to feed a strip of material, means to punch caps from said strip, means to form said caps with flat tops and side flanges and to leave said caps in inverted position in the holes in the strip from which they are punched, and guide means engaging the inverted tops of said caps to guide the same as the caps are drawn along with the strip during the feeding of the strip, and means to receive said caps from said guide means, said caps being adapted to fall into said last means after being fed to a predetermined position by said strip.

28. In a device of the class described, means to feed strip material, cap-sealing means, motor-driven means to actuate said first and second means including a transmission device, a hand-driven means, and means to release said transmission device from driving condition and to operatively connect said hand-driven means to said first and second means, whereby said first and second means may be hand operated without actuating said motor-driven means and said transmission device.

29. In a device of the class described, means to feed strip material, cap-making means adapted to punch caps out of said strip material, cap-applying means adapted to apply said caps to bottle tops, cap-sealing means adapted to seal said caps onto said bottle tops, motor-driven mechanism for all of said means, means to release said cap-making means from said motor-driven mechanism, and means to manually actuate said cap-sealing means and said feed means independently of said motor-driven means.

30. In a device of the class described, means to feed strip material, cap-making means comprising a punch adapted to punch a blank from strip material, a cap-forming means adapted to form said blank into a cap with a flat top and a side flange, and means to remove said cap from said forming means and to leave the cap in inverted position in the hole in said strip material from which it was punched, whereby the cap is fed along on its inverted top side flange with said strip material to a subsequent station.

31. In a device of the class described, means to feed strip material, cap-making means comprising a punch adapted to punch a blank from said strip material, said punch having a bore conforming to a cap with a flat top and a side flange, a ram adapted to force said blank into said bore to form said cap, means to separate said punch and said ram, and means to remove said cap from said bore and to leave said cap in inverted position in the hole in said strip material from which it was punched, whereby the cap is fed along on its inverted top with said strip material to a subsequent station.

32. In a device of the class described, means to feed strip material, cap-making means comprising a punch adapted to punch a blank from said strip material, said punch having a bore conforming to a cap with a flat top and a side flange, a ram adapted to force said blank into said bore to form said cap, means to separate said punch and said ram, a plunger within said punch and movable relative thereto to remove said cap from said bore and to leave said cap in inverted position in the hole in said strip material from which it was punched, whereby the cap is fed along on its inverted top with said strip material to a subsequent station.

33. A cap-making device comprising a punch member, a backing ring, means to move said punch member into engagement with said backing ring and to continue said movement together with said backing ring to punch a blank from sheet material, a ram adapted to force said blank into a recess in said punch to form the cap, means to separate said punch and said ram, and a stationary member within said punch adapted to release said cap therefrom when said punch is retracted.

34. A cap-making device for making a cap from sheet material comprising oppositely movable members adapted to engage opposite sides of said sheet to punch and form a cap and a stationary knock-off member adapted to separate said cap from said movable members when the latter are retracted.

35. In a device of the class described, cap-making means including means to feed a strip of material, means to punch and form caps with flat tops and side flanges from said strip and to leave said caps in inverted position in the holes in the strip from which they are punched, whereby said caps are drawn along on their inverted tops with the strip during the feeding of the strip, cap-applying means and a guide adapted to receive caps in edge-to-edge relationship from said strip and to supply said caps to said cap-applying means.

36. The method of making caps from strip material which comprises intermittently feeding said strip material, punching a cap therefrom, forming side flanges on said cap, leaving the cap in inverted position in the hole in said strip material from which it was punched and feeding the cap in said hole on its inverted top to the next station by movement of the strip material.

37. A device of the class described comprising cap-applying means adapted to support a cap in upright edgewise position with the lower end of the cap exposed to be engaged by the top of a bottle moving horizontally, and a plurality of roller means adapted to successively engage the side of the cap opposite from the side the bottle engages, said roller means and moving bottle top cooperating to cause the cap to be applied on the bottle top without substantial distortion as the bottle moves past the cap-applying means.

38. A device of the class described comprising cap-applying means adapted to support a cap in upright edgewise position with the lower end of the cap exposed to be engaged by the top of a bottle moving horizontally, and a plurality of yieldable roller means adapted to successively engage the side of the cap opposite from the side the bottle engages, said yieldable roller means and moving bottle top cooperating to cause the cap to be applied on the bottle top as the bottle moves past the cap-applying means.

39. A device of the class described comprising cap-applying means adapted to support a cap in upright edgewise position with the lower end of the cap exposed to be engaged by the top of a bottle moving horizontally, and a plurality of rollers adapted to successively engage the side of the cap opposite from the side the bottle engages, each roller being independently gravity-actuated, said rollers and moving bottle top cooperating to cause the cap to be applied on the bottle top without substantial distortion as the bottle moves past the cap-applying means.

40. A device of the class described incorporating a cap-applying means comprising a chute adapted to support a cap with its lower end exposed to be engaged by the top of a bottle moving horizontally, a plurality of rollers disposed adjacent the exposed end of the cap adapted to successively engage the side of the cap opposite from the side the bottle engages, said rollers being independently gravity-actuated, the rollers and moving bottle top cooperating to cause the cap to be picked from the chute and applied to the bottle top without substantial distortion as the bottle moves past the cap-applying means.

41. In a device of the class described, a cap-applying mechanism comprising a cap-supporting chute adapted to support a cap with its lower end exposed to be engaged by the top of a bottle moving horizontally, oppositely disposed, spaced arm members adjacent the exposed end of the cap, a plurality of gravity-actuated rollers supported in said spaced arm members, said rollers being adapted to function independently to successively engage the side of the cap opposite from the side the bottle engages, said rollers and moving bottle top cooperating to turn the cap out of the chute and position the same flatly upon the bottle top without substantial distortion as the bottle moves past the cap-applying means.

JOHN E. SHARP.
MAX M. KIPFER.

CERTIFICATE OF CORRECTION.

Patent No. 2,096,346.  October 19, 1937.

JOHN E. SHARP, ET AL.

It is hereby certified that error appears in the printed specification of the above numbered patent requiring correction as follows: Page 9, second column, line 42, claim 24, after the word "means" insert a comma; page 10, first column, line 51, claim 30, strike out the words "side flange"; and that the said Letters Patent should be read with these corrections therein that the same may conform to the record of the case in the Patent Office.

Signed and sealed this 21st day of December, A. D. 1937.

(Seal)

Henry Van Arsdale,
Acting Commissioner of Patents.

bottle top without substantial distortion as the bottle moves past the cap-applying means.

40. A device of the class described incorporating a cap-applying means comprising a chute adapted to support a cap with its lower end exposed to be engaged by the top of a bottle moving horizontally, a plurality of rollers disposed adjacent the exposed end of the cap adapted to successively engage the side of the cap opposite from the side the bottle engages, said rollers being independently gravity-actuated, the rollers and moving bottle top cooperating to cause the cap to be picked from the chute and applied to the bottle top without substantial distortion as the bottle moves past the cap-applying means.

41. In a device of the class described, a cap-applying mechanism comprising a cap-supporting chute adapted to support a cap with its lower end exposed to be engaged by the top of a bottle moving horizontally, oppositely disposed, spaced arm members adjacent the exposed end of the cap, a plurality of gravity-actuated rollers supported in said spaced arm members, said rollers being adapted to function independently to successively engage the side of the cap opposite from the side the bottle engages, said rollers and moving bottle top cooperating to turn the cap out of the chute and position the same flatly upon the bottle top without substantial distortion as the bottle moves past the cap-applying means.

JOHN E. SHARP.
MAX M. KIPFER.

CERTIFICATE OF CORRECTION.

Patent No. 2,096,346. October 19, 1937.

JOHN E. SHARP, ET AL.

It is hereby certified that error appears in the printed specification of the above numbered patent requiring correction as follows: Page 9, second column, line 42, claim 24, after the word "means" insert a comma; page 10, first column, line 51, claim 30, strike out the words "side flange"; and that the said Letters Patent should be read with these corrections therein that the same may conform to the record of the case in the Patent Office.

Signed and sealed this 21st day of December, A. D. 1937.

(Seal)

Henry Van Arsdale,
Acting Commissioner of Patents.

CERTIFICATE OF CORRECTION.

Patent No. 2,096,346.   October 19, 1937.

JOHN E. SHARP, ET AL.

It is hereby certified that error appears in the printed specification of the above numbered patent requiring correction as follows: Page 9, second column, line 42, claim 24, after the word "means" insert a comma; page 10, first column, line 51, claim 30, strike out the words "side flange"; and that the said Letters Patent should be read with these corrections therein that the same may conform to the record of the case in the Patent Office.

Signed and sealed this 21st day of December, A. D. 1937.

(Seal)

Henry Van Arsdale,
Acting Commissioner of Patents.